United States Patent [19]
Arai et al.

[11] Patent Number: 5,551,308
[45] Date of Patent: Sep. 3, 1996

[54] METHOD AND APPARATUS FOR CONTROLLING A FORCE ASSIST APPARATUS

[75] Inventors: Hirohiko Arai; Kazuo Tanie; Yasuo Hayashibara, all of Tsukuba, Japan

[73] Assignee: Agency of Industrial Science & Technology, Ministry of International Trade & Industry, Tokyo, Japan

[21] Appl. No.: 498,486

[22] Filed: Jul. 5, 1995

[30] Foreign Application Priority Data

Jul. 6, 1994 [JP] Japan .................................. 6-177471

[51] Int. Cl.$^6$ ................................................ G01L 1/00
[52] U.S. Cl. ............................. 73/862.541; 73/862.041
[58] Field of Search ........................ 73/379.01, 865.4, 73/862.541, 862.041; 414/4, 5

[56] References Cited

U.S. PATENT DOCUMENTS

| | | | |
|---|---|---|---|
| 4,575,297 | 3/1986 | Richter | 414/5 |
| 5,143,505 | 9/1992 | Burdea et al. | 414/5 |
| 5,184,319 | 2/1993 | Kramer | 414/5 |
| 5,348,519 | 9/1994 | Prince et al. | 73/379.01 X |
| 5,354,162 | 10/1994 | Burdea et al. | 414/5 |

*Primary Examiner*—Richard Chilcot
*Assistant Examiner*—Elizabeth L. Dougherty
*Attorney, Agent, or Firm*—Oblon, Spivak, McClelland, Maier, & Neustadt, P.C.

[57] ABSTRACT

A method of controlling a force assist apparatus worn on a human body comprises separating a force signal relating to a load force imposed on the force assist apparatus detected by a force sensor into a static force component and a dynamic force component, attenuating the static force by a smaller factor than the factor by which the dynamic force is attenuated, attenuating the dynamic force by a factor within a range according to actuator output margin in which saturation does not occur, summing the attenuated signals, subtracting an operating force signal detected by a force sensor from the sum, and using the total signal as an output command to drive actuators.

3 Claims, 2 Drawing Sheets

METHOD AND APPARATUS FOR CONTROLLING A FORCE ASSIST APPARATUS

BACKGROUND OF THE INVENTION

1. Field of the Invention

The present invention relates to a method and apparatus for controlling a force assist apparatus used for nursing and rehabilitation tasks in hospitals and homes, and for the conveyance of heavy objects such as in the manufacturing, mining, agriculture, fisheries, construction and distribution industries.

2. Description of the Prior Art

Exoskeleton force assist apparatuses that are worn by an operator to attenuate a load force applied to the operator include apparatuses developed in the 1960s by General Electric of the United States, and the systems being researched since the latter part of the 1980s by Kazerooni of the University of California at Berkeley. In each of these, a load force exerted on the apparatus is attenuated by a fixed factor and applied to the operator. The aim of these conventional apparatuses is to help an operator to accomplish a heavy-duty task by amplifying his/her force by a very high degree. However, a problem with these systems are that the safety of the operator cannot be fully ensured in an emergency stop of the apparatus. This problem arises because the apparatus is used in an attempt to accomplish a heavy-duty task that cannot be done by a human alone.

At various operation sites, such as in rehabilitation care and the like, it may be that while an unaided human may be able to accomplish a task, the task imposes an excessive load on the human and may be difficult to carry out continuously over an extended period of time. In such cases, applying a force assist apparatus is not only effective for reducing the load on the operator, but can also ensure the safety of operators, since the load is not so large, even in an emergency stop of the apparatus. In such a case, however, with no heavy-duty operation being involved, there is a need for an apparatus that is lighter and more compact than the conventional arrangements. For this, a force assist arrangement is required that uses compact actuators which have a smaller torque or force output.

However, when actuators are reduced in size and used at near the limit of their torque/force output capability, there is a risk that during operation the actuators will reach the limit of their output and become saturated. When actuators become saturated, the apparent force attenuation factor rapidly deteriorates and the ratio of the assist force undergoes unpredictable, discontinuous changes, impeding smooth operation and actually causing operator fatigue. With the type of conventional apparatus described above, the only way around this problem is to increase the attenuation factor itself. While doing this enables actuator saturation to be circumvented, it reduces the force assist effect and limits the types of tasks that can be accomplished.

The object of the present invention is to provide a method and apparatus for controlling a force assist apparatus that, with respect to small-output actuators, does not give rise to actuator saturation and does not reduce the force assist effect.

SUMMARY OF THE INVENTION

For achieving this object, the present invention provides a method of controlling a force assist apparatus worn on a human body, comprising separating a force signal relating to a load force imposed on the force assist apparatus detected by a force sensor into a static force component and a dynamic force component, attenuating the static force by a smaller factor than the factor by which the dynamic force is attenuated, attenuating the dynamic force by a factor within a range according to actuator torque/force output margin in which saturation does not occur, summing the attenuated force signals, subtracting an operating force, and using the summed signals as an output command to drive actuators.

With the above control method, the attenuation factors for static forces and dynamic forces can be changed independently, and prior to the use of the force assist apparatus, the static force exerted on the work load can be detected beforehand and attenuation factors set with respect to the load inertia and static and dynamic forces acting on the load.

The object of the invention is also achieved by an apparatus for controlling a force assist apparatus worn on a human body, comprising two force sensors that detect operating and load forces imposed on the force assist apparatus, a force separation section that separates a detected load force signal from the force sensor into a static force component and a dynamic force component, two attenuater sections that individually attenuate the static and dynamic force components by separate factors, an adder section that sums outputs of the two attenuater sections, a subtracter section that subtracts an operating force signal from the sum, and a control section that applies a subtracter section output signal as an actuator drive signal.

In an operation performed by an exoskeleton type force assist apparatus, there are two types of forces to be assisted, which are a static force such as gravity, and a dynamic force such as inertia. The above arrangement according to this invention enables the attenuation factor relating to static forces and the attenuation factor relating to dynamic forces to be independently adjusted. In particular, with priority on assisting static force, adequate compensation of static force is ensured by setting a low attenuation factor, and the dynamic force attenuation factor is set within a range in which saturation does not occur, based on the extra margin of actuator output.

Moreover, although the ratio of dynamic force assistance varies according to the type of load being handled, since the operator can adjust the velocity and acceleration of his or her operations to the apparent mass of the inertial load, it is difficult for actuator saturation to occur. Therefore, even if there is a slight decrease in the ratio of dynamic force assistance, it does not cause a decrease in operability. Also, as adequate assistance is provided with respect to a constantly exerted static force, the burden on the operator is greatly reduced without reducing the force assist effect.

The above and other features of the present invention will become apparent from the following description made with reference to the drawings.

DESCRIPTION OF THE PREFERRED EMBODIMENTS

The present inventors found that in a force assist apparatus that uses small-output torque/force actuators, force assistance can be effected without actuator saturation by independently setting appropriate attenuation factors for static components (gravity) and dynamic components (inertia) and driving the actuators by the value obtained by this attenuation factor.

Figure 1:
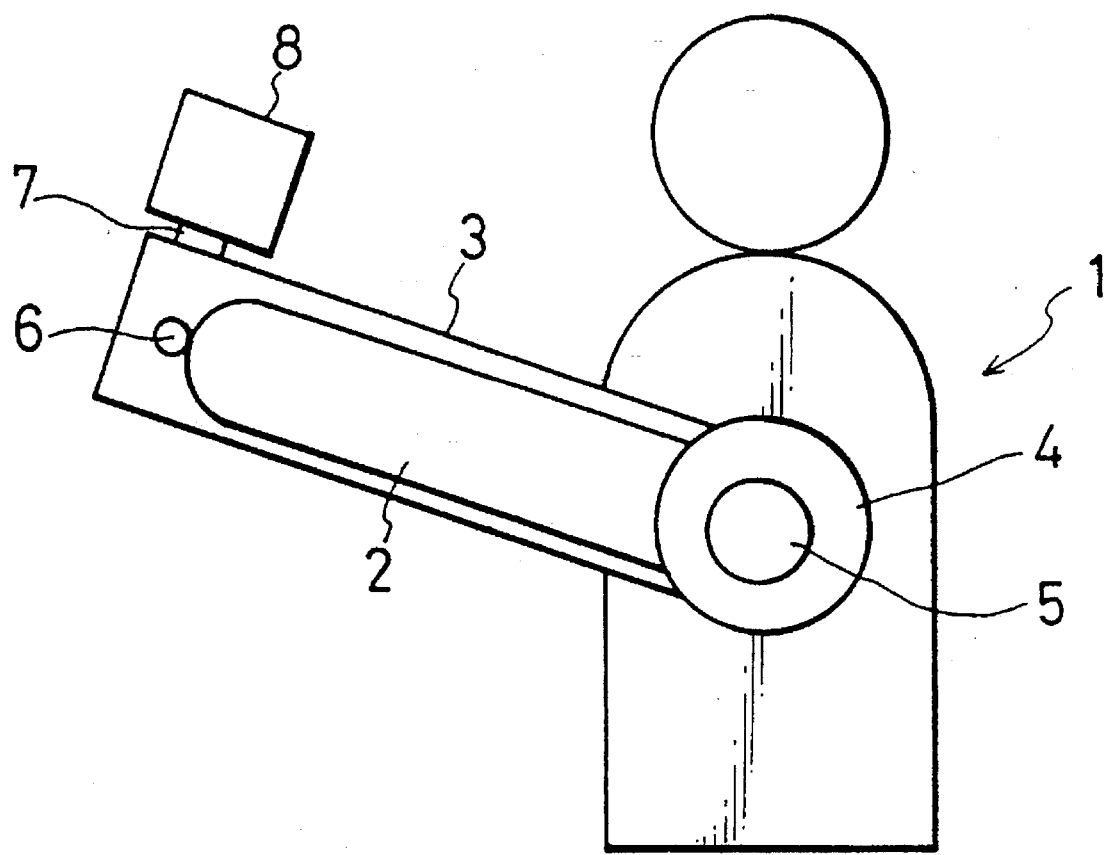
FIG. 1 shows the arrangement of an embodiment of a force assist apparatus controlled by the control apparatus according to the present invention.

FIG. 1 shows an embodiment of a force assist apparatus controlled in accordance with this invention to amplify the force of a human operator. In the example of this embodiment the force assist apparatus constituted by links and the like comprises an exoskeleton 3 worn on an upper limb such as an arm 2 or another external part of a human operator 1 on which the apparatus can be fitted. A joint of the apparatus is provided with a force assist actuator 4 and a joint angle sensor 5. When the apparatus is equipped with multiple joints, each of the joints has an actuator 4 and joint angle sensor 5.

The exoskeleton 3 is provided with a force sensor 6 arranged between the operator's hand and the tip of the exoskeleton 3. The force sensor 6 detects an operating force acting on the exoskeleton 3 by the operator's hand. The exoskeleton 3 is provided with a force sensor 7 arranged at a part of the tip of the exoskeleton 3 on which a work load 8 acts, to detect a force imposed by the work load 8. The signals from the force sensor 6, force sensor 7 and joint angle sensor 5 are input to a control apparatus 11, shown in FIG. 2, comprised by a computer.

There are two types of force to be assisted, a static force such as gravity and a dynamic force such as inertia. Static force is exerted on the operator regardless of the operator's behavior. In contrast, a dynamic force changes in accordance with changes in the velocity and acceleration of the operator's operating movements.

The control apparatus 11 allows attenuation factors applied to dynamic and static forces to be independently controlled. In particular, with priority on assisting static force, adequate compensation of static force is ensured by setting a low attenuation factor, and the dynamic force attenuation factor is set within a range in which saturation does not occur, based on the extra margin of actuator torque/force output.

Also, prior to the operation of the force assist apparatus, as described below, the gravitational force acting on the load and the inertia of the load can be detected beforehand and used as a basis to determine a gravitational force attenuation factor $\alpha$ and an inertial force attenuation factor $\beta$ and, if required, to set attenuation factors that include an external input.

Figure 2:
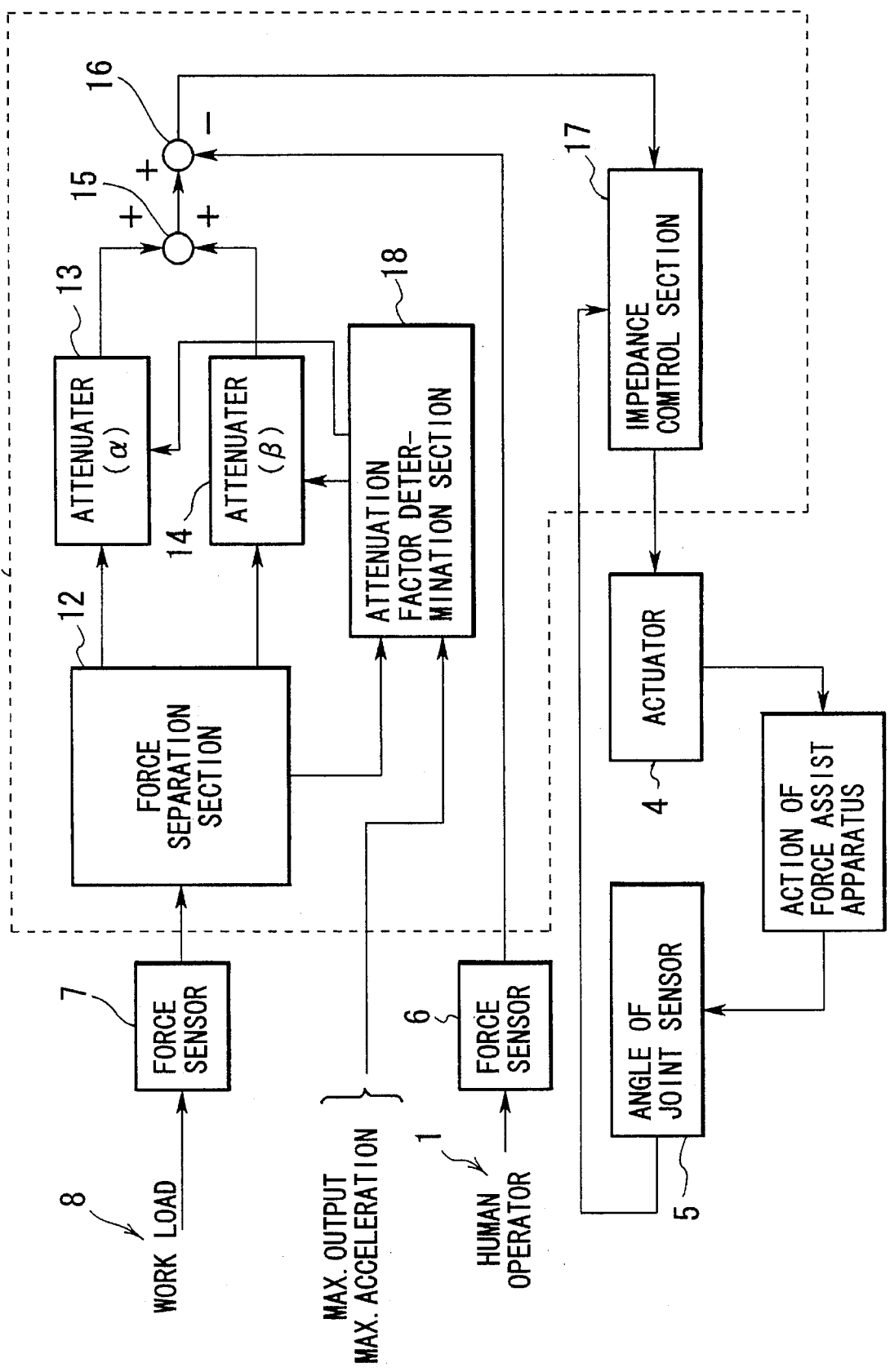
FIG. 2 is a block diagram of an embodiment of the control apparatus of the invention.

To control the actuator 4, as shown in FIG. 2 the control apparatus 11 is provided with a force separation section 12, attenuaters 13 and 14, an adder section 15, an adder/subtracter section 16 and an impedance control section 17. When the operator's hand applies a force to the exoskeleton 3, the operating force is detected by the force sensor 6, the load force is detected by the force sensor 7 and a load signal is output by the force sensor 7, the force separation section 12 separates the gravity (static) components from the inertial (dynamic) components in the load signal. The attenuaters 13 and 14 attenuate the static force component and dynamic force component by attenuation factors $\alpha$ and $\beta$, respectively, and the adder section 15 adds the outputs of the attenuaters 13 and 14. The subtracter section 16 equalizes the outputs of the adder section 15 and force sensor 6, and outputs the resulting signal to the impedance control section 17.

The impedance control section 17 receives the above force information and the information from the joint angle sensor 5, and on the basis of this information issues an output command to the actuator 4. In accordance with this output command, the actuator 4 exerts an appropriate force to individually assist static and dynamic forces. This action by the force assist apparatus assists the operation applied to the work load 8 by the operator 1. The movement of the exoskeleton 3 generated by the actuator 4 is detected by the joint angle sensor 5 and used as feedback to the impedance control section 17.

In the force assist apparatus thus configured, force signals from the force sensor 7 are separated into static force components and dynamic force components by the force separation section 12. This separation is accomplished by the following method.

First, the work load 8 is lifted to a stationary position by the force assist apparatus at a velocity that is low enough to allow the acceleration to be disregarded, and the weight of the load 8 is measured by the force sensor 7. The vertical component of the signal output at this point by the force sensor 7 will represent the gravitational force acting on the load 8. The mass of the load is obtained by dividing this value by gravitational acceleration. Reducing the vertical component in the signal leaves the dynamic force component, enabling static and dynamic force components to be readily separated.

Another embodiment of a method of separating the static and dynamic force components in the signal produced by the force sensor 7 will now be described. Static force components change more slowly than dynamic force components, so the frequency component thereof will be in a low range that includes a direct current portion. This being the case, the low frequency component can be extracted by including a low-pass filter in the force separation section 12 and passing the signal from the force sensor 7 through the filter. The value thus extracted will correspond to the static component, and therefore the signal value reduced by the extracted value is the dynamic force component. Once the signal from the force sensor 7 has been divided into static and dynamic force components, for the gravitational force an attenuation factor $\alpha$ is determined that provides sufficient compensation with respect to gravity, and for the dynamic force, an attenuation factor $\beta$ is determined from the difference between the torque/force output limit of the actuator 4 and the actuator output compensated for the gravitational force.

An example of the determination of attenuation factors $\alpha$ and $\beta$ by an attenuation factor determination section 18 will now be described. The maximum torque/force output of the actuator of the force assist apparatus is determined. In this embodiment, it is assumed that an actuator is used that can generate a force of 50 kgf. When this actuator is to be used to handle a load of 40 kg, assuming that with respect to the static force the system is set to amplify the operator's force by 20, the attenuation factor $\alpha$ will be 1/(20-1), which is about 0.053. If the actuator is operated at this attenuation, as the actuator generates a force of 38 kg, the force margin will be 12 kgf. Based on the specifications of the operation, the maximum acceleration the operator should apply to the load is estimated. If the estimated acceleration is 0.5 G(G being gravitational acceleration), the inertial force to produce this acceleration will be 40×0.5=20 kgf. As the actuator can generate 12 kgf, the force to be provided by the operator will be 20−12=8 kgf. This means an attenuation factor $\beta$ of 8/12 (about 0.67).

In this explanation $\alpha$ and $\beta$ are given as attenuation factors, in practice they are the ratio of the force generated by the operator to the force generated by the force assist apparatus. In the example of the above embodiment, with an attenuation factor $\alpha$ of 0.05 and a $\beta$ of 0.67 and no acceleration on the load, to the operator the weight of a 40 kgf load will feel like 2 kgf. Applying an acceleration of 0.5 G will generates a further 20 kgf of dynamic force, of which the operator's share will be 8 kgf.

In an operation using the force assist apparatus, a force applied to a load detected by the force sensor 7 is separated into static and dynamic force components by the force separation section 12. These components are then attenuated in the respective attenuaters 13 and 14 by respective factors $\alpha$ and $\beta$ calculated by the attenuation factor determination section 18, and the sums thereof equalized with the force applied by the operator 1 as detected by the force sensor 6 are input to the impedance control section 17. On the basis of this force information and information from the joint angle sensor 5, the impedance control section 17 sends an output command to the actuator 4, causing the actuator 4 to exert a force that assists the operator with the operation.

While the ratio of dynamic force assistance varies according to the type of load 8 being handled in the operation, the operator can adjust the velocity and acceleration of his or her operating movements to match the apparent mass of the inertial load. That is, when a small dynamic force attenuation factor is used, the inertial load seems lighter and the operator can therefore perform operations at higher speed. On the other hand, a large attenuation factor makes the load feel heavier, slowing the operator's movements. Thus, as the force adapts to the human operator, the inertia imposed on the operator or force assist apparatus never becomes excessive. As a result, it is not easy for actuator saturation to occur and thereby hinder the smooth operation of the apparatus and degrade operating efficiency, as is the case with conventional arrangements. Also, as sufficient assistance is provided with respect to the constant application of static force, the load on the operator is considerably reduced without reducing the force assist effect.

In accordance with the foregoing method and apparatus for controlling a force assist apparatus, using small-output actuators, attenuation factors are independently set for gravitational and inertial forces, so control of the force assist apparatus can be effected without actuator saturation or reduction of the force assist effect.

What is claimed is:

1. A method of controlling a force assist apparatus worn on a human body, comprising:

separating a force signal relating to a load force imposed on the force assist apparatus detected by a force sensor into a static force component and a dynamic force component, attenuating the static force by a smaller factor than the factor by which the dynamic force is attenuated, attenuating the dynamic force by a factor within a range according to actuator output margin in which saturation does not occur, summing the attenuated signals, subtracting an operating force signal detected by a force sensor from the sum, and using the total signal as an output command to drive actuators.

2. A control method according to claim 1, wherein the static force attenuation factor and the dynamic force attenuation factor can be changed independently and, prior to driving the force assist apparatus, the static force exerted on the work load is detected beforehand and attenuation factors are set with respect to load inertia and static and dynamic forces on the load.

3. An apparatus for controlling a force assist apparatus worn on a human body, comprising:

two force sensors that detect operating and load forces imposed on the force assist apparatus, a force separation section that separates a detected load force signal from the force sensor into a static force component and a dynamic force component, two attenuater sections that individually attenuate the static and dynamic force components by a separate factor, an adder section that sums outputs of the two attenuater sections, a subtracter section that subtracts a detected operating force signal from the force sensor, and a control section that applies a subtracter section output signal as an actuator drive signal.

* * * * *